(12) United States Patent
Dengler et al.

(10) Patent No.: US 9,098,659 B2
(45) Date of Patent: Aug. 4, 2015

(54) ADVANCED ARRAY LOCAL CLOCK BUFFER BASE BLOCK CIRCUIT

(71) Applicant: International Business Machines Corporation, Armonk, NY (US)

(72) Inventors: Osama Dengler, Boeblingen (DE); Thomas Froehnel, Leonberg (DE); Juergen Pille, Stuttgart (DE); Rolf Sautter, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/159,570

(22) Filed: Jan. 21, 2014

(65) Prior Publication Data

US 2014/0137070 A1    May 15, 2014

Related U.S. Application Data

(62) Division of application No. 13/269,654, filed on Oct. 10, 2011, now abandoned.

(51) Int. Cl.
| | | |
|---|---|---|
| *G06F 17/50* | (2006.01) | |
| *G06F 1/08* | (2006.01) | |
| *G06F 1/10* | (2006.01) | |

(52) U.S. Cl.
CPC .............. *G06F 17/5031* (2013.01); *G06F 1/08* (2013.01); *G06F 1/10* (2013.01); *G06F 17/5045* (2013.01)

(58) Field of Classification Search
CPC ... G06F 17/5031; G06F 17/5045; G06F 1/04; G06F 1/08

USPC .................. 713/401, 500–503; 716/134, 136; 326/93, 95, 98; 327/172, 202, 291; 365/233.11, 233.12

See application file for complete search history.

(56) References Cited

U.S. PATENT DOCUMENTS

| | | |
|---|---|---|
| 5,757,218 A | 5/1998 | Blum |
| 6,392,466 B1 | 5/2002 | Fletcher |
| 7,459,950 B2 | 12/2008 | Ngo et al. |
| 7,719,315 B2 | 5/2010 | Ngo et al. |
| 7,813,189 B2 | 10/2010 | Chan et al. |
| 2001/0026172 A1* | 10/2001 | Leenstra et al. ................. 326/93 |
| 2004/0015670 A1 | 1/2004 | Chao |
| 2008/0046772 A1 | 2/2008 | Arsovski et al. |
| 2008/0100360 A1 | 5/2008 | Ngo et al. |
| 2008/0310246 A1 | 12/2008 | Joshi et al. |
| 2009/0267667 A1 | 10/2009 | Chan et al. |
| 2010/0164586 A1 | 7/2010 | Sautter et al. |
| 2010/0302896 A1 | 12/2010 | Kono |
| 2011/0304370 A1 | 12/2011 | Bunce et al. |
| 2012/0020173 A1 | 1/2012 | Liu |

OTHER PUBLICATIONS

U.S. Appl. No. 13/269,654, 2 pages.

* cited by examiner

*Primary Examiner* — Glenn A Auve
(74) *Attorney, Agent, or Firm* — Francis Lammes; Stephen J. Walder, Jr.; Thomas E. Tyson (57) ABSTRACT

A clock stretcher mechanism is provided for shifting a rising edge of a negative active global clock signal beyond a rising edge of a feedback path signal. A negative active global clock signal and a clock chopper signal are received in a base block. First base block circuitry modifies the clock chopper signal in order to form the feedback path signal. Second base block circuitry shifts the rising edge of the negative active global clock signal beyond the rising edge of the feedback path signal using a delay negative active global clock signal.

7 Claims, 6 Drawing Sheets

ADVANCED ARRAY LOCAL CLOCK BUFFER BASE BLOCK CIRCUIT

BACKGROUND

The present application relates generally to an improved data processing apparatus and method and more specifically to mechanisms for an advanced array local clock buffer base block circuit.

High performance arrays, such as a static random access memory (SRAM), normally require dock generation circuits to control internal circuit timings. These clock generation circuits (also known as Local Clock Buffers (LCBs)) are used to control array word decode/bit decode and read/write critical circuit functions. To provide timing tuning flexibilities as well as hardware debug capabilities, state of the art array LCBs often have programmable controls on its clock delay or pulse width circuits. Multiple discrete timing settings of delay or pulse width are implemented with explicit decoders and with typical inverter delay chains. Such programmability of timing settings of delay or pulse width however adds circuit complexity, chip area and power consumption to the LCB structures. A state of the art local dock control buffer is constructed with modular circuit blocks. This modular topology makes the design extremely flexible to drive different clock loads and latch types.

An array LCB uses the common logical base block used for all LCB applications on the chip. Such an array LCB also has additional devices in the feedback path to vary the pulse with of the output clock signal (clk). A short cycle time of 184 picoseconds and a high mid cycle uncertainty of 18 picoseconds creates massive race between rising negative active global dock signal (nclk) and the feedback path signal (fb_2). That is, the pulse width of the output clock signal (clk) is no long determined by the feedback path signal but by the nclk rising edge. This makes the array LCB output pulse width vary over nclk frequency which is very critical for array applications.

To guarantee a cycle-time independent pulse width over different cycle times, big devices are required in the array LCB feedback path to ensure that the feedback path is always faster than the fastest nclk situation. Further, cycle stealing is required inside the array LCB to overcome the race between feedback path and the rising nclk. The state of the art array LCB only works in default delay and pulse width settings and big devices in the array LCB feedback path significantly increase the area required for such array LCBs.

SUMMARY

In one illustrative embodiment, a base block circuit is provided for shifting a rising edge of a negative active global clock signal beyond a rising edge of a feedback path signal. The illustrative embodiment receives the negative active global clock signal and a clock chopper signal. First base block circuitry, in the illustrative embodiment, modifies the clock chopper signal in order to form the feedback path signal. Second base block circuitry, in the illustrative embodiment, shifts the rising edge of the negative active global clock signal beyond the rising edge of the feedback path signal using a delay negative active global clock signal.

In another illustrative embodiment, a local clock buffer is provided that comprises a base block circuit, a clock chopper control circuit, local clock delay circuit, and local clock driver circuit. In the illustrative embodiment, the base block circuit receives the negative active global clock signal and a clock chopper signal. First base block circuitry, in the illustrative embodiment, modifies the clock chopper signal in order to form the feedback path signal. Second base block circuitry, in the illustrative embodiment, shifts the rising edge of the negative active global clock signal beyond the rising edge of the feedback path signal using a delay negative active global clock signal.

In yet another illustrative embodiment, a design structure embodied in a non-transitory machine readable medium for designing, manufacturing, or testing an integrated circuit. In the illustrative embodiment, the design structure comprises a first design structure element for modifying a clock chopper signal in order to form a feedback path signal. In the illustrative embodiment, the design structure comprises a second design structure for shifting the rising edge of a negative active global clock signal beyond the rising edge of the feedback path signal using a delay negative active global clock signal.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an advanced array local clock buffer (LCB) base block circuit that overcomes the race between a feedback path signal and a rising negative active global clock signal (nclk). The illustrative embodiments provide a clock stretcher at the array LCB base block input state that shifts the rising nclk edge beyond the rising feedback path signal edge under all conditions.

Figure 1:
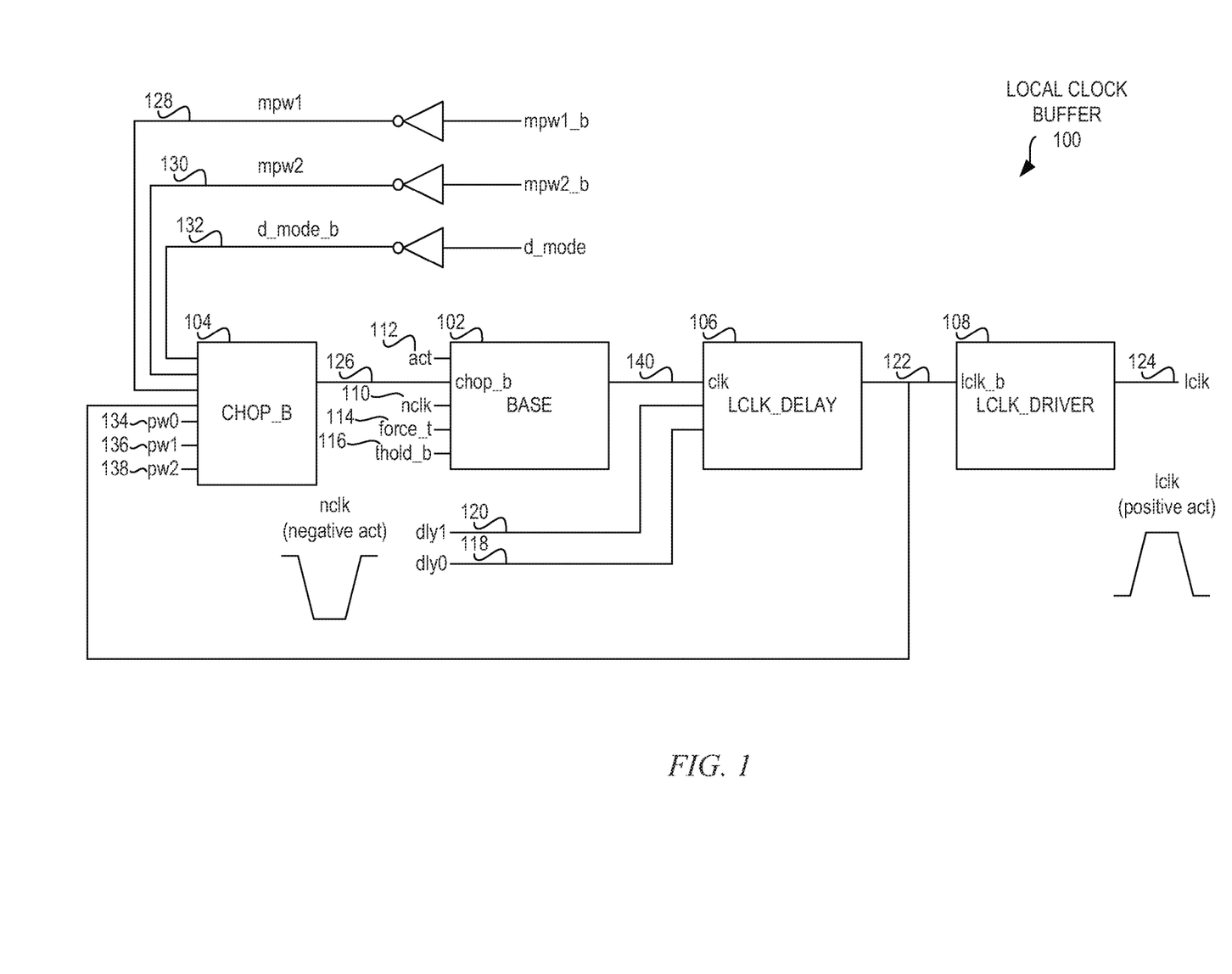
FIG. 1 depicts one example of an array local clock buffer in accordance with an illustrative embodiment.

FIG. 1 depicts one example of an array local clock buffer in accordance with an illustrative embodiment. Local clock buffer (LCB) 100 comprises many sub-blocks such as, for example, base block 102, chop_b block 104, lclk_delay block 106, and lclk_driver block 108. Base block 102 is the basic/functional control circuitry of the LCB 100. Base block 102 is driven from negative active global clock signal (nclk) 110 and has an integrated latch function to capture act signal 112, force_t signal 114, and thold_b signal 116. Base block 102 has a feedback input signal called pwvar_chop_b signal 126 or chop_b signal 126 that controls the pulsed clock behavior of the output clock signal clk 140.

The output of base block 102 is electrically couple to lclk_delay block 106. Lclk_delay block 106 provides programmable clock delay control and, in one embodiment, is programmable and includes 3 delay settings. In particular, lclk_delay block 106 uses 2 mode bits (dly0 118, dly1 120) to provide 3 delay settings (default, 1-notch delay, and 2-notch delay). The 2-to-3 decode function is combined with the delay chains in the lclk_delay block 106. In one embodiment, the delay chains are configured with modulated PFET/NFET inverter structure instead of simple inverter chains.

The output of lclk_delay block 106, lclk_b signal 122 is electrically coupled to both lclk_driver block 108 and base chop_b block 104. Lclk_driver block 108 creates an output clock signal, lclk signal 124 to an array. In one embodiment, lclk_driver block 108 may be implemented as a parameterized inverter block to adapt LCB 100 to the particular clock net.

Chop_b block 104 is provided for clock chopper control and controls pulse width by sending pwvar_chop_b signal 126 back to base block 102. In one embodiment, chop_b block 104 may accept input signals mpw1 128 and mpw2 130 to widen or narrow pulse width by +/−0.5F04. In one embodiment, chop_b block 104 may only be operative when d_mode_b signal 132 is high. In addition, chop_b block 104 may provide for programmable clock pulse width control. Programmable clock pulse width control is an expanded pulse width programmability implemented in the clock feedback path with four different pulse width settings. The four settings are controlled by the input signals pw0 134, pw1 136, and pw2 138.

Figure 2:
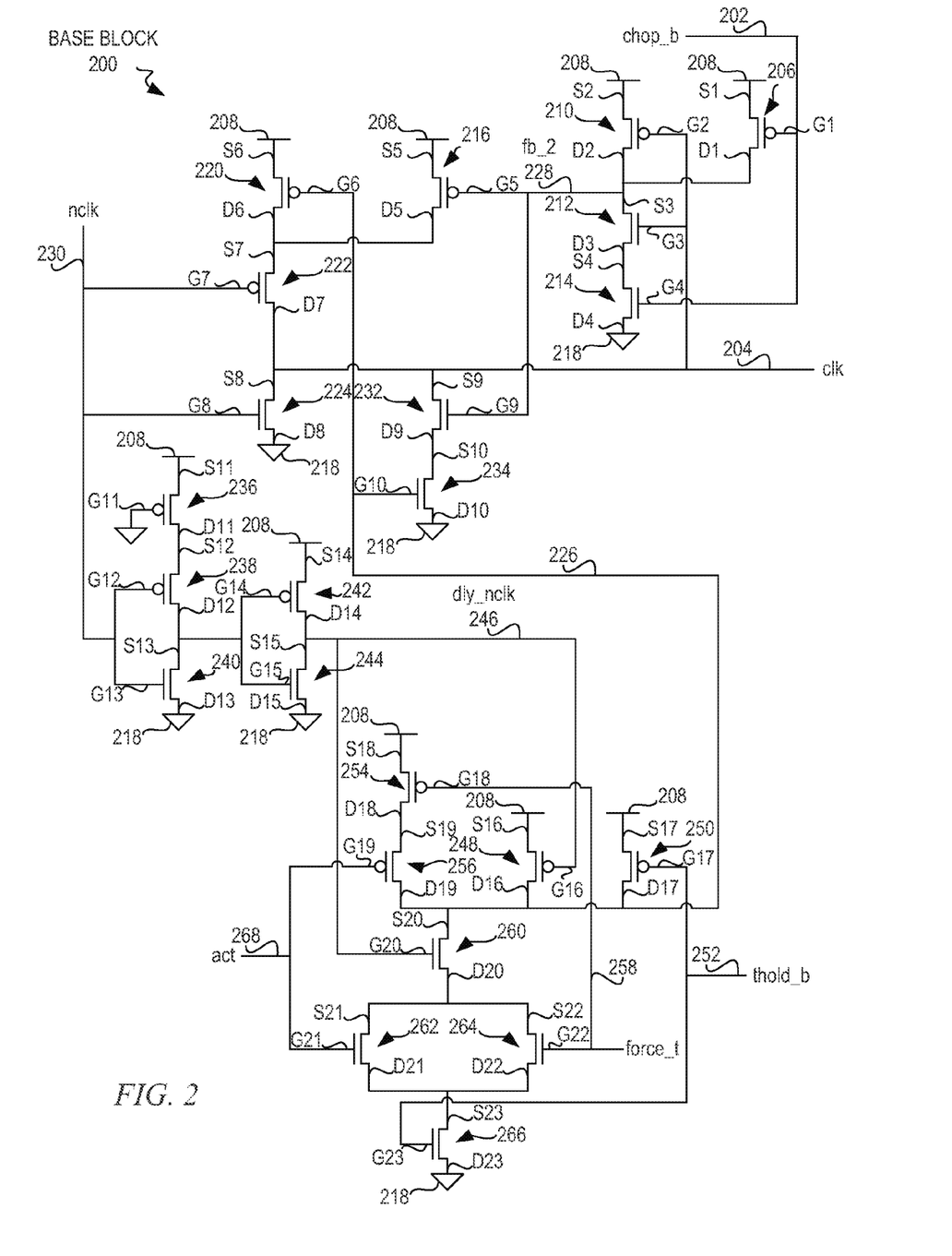
FIG. 2 depicts one exemplary configuration of a base block in accordance with an illustrative embodiment.

FIG. 2 depicts one exemplary configuration of a base block in accordance with an illustrative embodiment. Base block 200 comprises many P-Channel Field Effect Transistors (P-FETs) and N-Channel Field Effect Transistor (N-FETs). As described previously, base block 200 receives clock chopper signal (chop_b) 202 that controls the pulsed clock behavior of the output clock signal (clk) 204. P-FET 206 includes a gate terminal (G1), a source terminal (S1), and a drain terminal (D1). Gate terminal G1 is electrically coupled to chop_b signal 202 and source terminal S1 is electrically coupled to voltage source (Vdd) 208.

P-FET 210 includes a gate terminal (G2), a source terminal (S2), and a drain terminal (D2). N-FET 212 includes a gate terminal (G3), a source terminal (S3), and a drain terminal (D3). N-FET 214 includes a gate terminal (G4), a source terminal (S4), and a drain terminal (D4). Gate terminal G2 is electrically coupled to gate terminal G3 as well as output clock signal (clk) 204. Source terminal S2 is electrically coupled to voltage source (Vdd) 208. Drain terminal D3 is electrically coupled to source terminal S4, gate terminal G4 is electrically coupled to clock chopper signal (chop_b) signal 202, and drain terminal D4 is electrically coupled to ground 218.

P-FET 216 includes a gate terminal (G5), a source terminal (S5), and a drain terminal (D5). Source terminal S5 is electrically coupled to voltage source (Vdd) 208. P-FET 220 includes a gate terminal (G6), a source terminal (S6), and a drain terminal (D6). P-FET 222 includes a gate terminal (G7), a source terminal (S7), and a drain terminal (D7). N-FET 224 includes a gate terminal (G8), a source terminal (S8), and a drain terminal (D8). Source terminal S6 is electrically coupled to voltage source (Vdd) 208, gate terminal G6 is electrically coupled to gate signal 226, and drain terminal D6 is electrically coupled to source terminal S7 as well as drain terminal D5. Gate terminal G7 is electrically coupled to negative active global clock signal (nclk) 230, and drain terminal D7 is electrically coupled to source terminal S8 as well as output clock signal (clk) 204. Gate terminal G8 is electrically coupled to negative active global clock signal (nclk) 230, and drain terminal D8 is electrically coupled to ground 218.

N-FET 232 includes a gate terminal (G9), a source terminal (S9), and a drain terminal (D9). N-FET 234 includes a gate terminal (G10), a source terminal (S10), and a drain terminal (D10). Source terminal S9 is electrically coupled to output clock signal (clk) 204, and gate terminal G9 is electrically coupled to gate terminal G5, drain terminal D2, source terminal S3, and drain terminal D1 to form feedback node (fb_2) 228. Drain terminal D9 is electrically coupled to source terminal S10, gate terminal G10 is electrically coupled to gate signal 226, and drain terminal D10 is electrically coupled to ground 218.

P-FET 236 includes a gate terminal (G11), a source terminal (S11), and a drain terminal (D11). P-FET 238 includes a gate terminal (G12), a source terminal (S12), and a drain terminal (D12). N-FET 240 includes a gate terminal (G13), a source terminal (S13), and a drain terminal (D13). Source terminal S11 is electrically coupled to voltage source (Vdd) 208, gate terminal G11 is electrically coupled to ground 218, and drain terminal D11 is electrically coupled to source terminal S12. Gate terminal G12 is electrically coupled to gate terminal G13 as well as negative active global clock signal (nclk) 230. Drain terminal D12 is electrically coupled to source terminal S13, and drain terminal D13 is electrically coupled to ground 218.

P-FET 242 includes a gate terminal (G14), a source terminal (S14), and a drain terminal (D14). N-FET 244 includes a gate terminal (G15), a source terminal (S15), and a drain terminal (D15). Source terminal S14 is electrically coupled to voltage source (Vdd) 208, gate terminal G14 is electrically coupled to gate terminal G15 as well as drain terminal D12 and source terminal S13, and drain terminal D15 is electrically coupled to ground 218. Drain terminal D14 is electrically coupled to source terminal S15 and form delay negative active global clock signal (dly_nclk) 246.

P-FET 248 includes a gate terminal (G16), a source terminal (S16), and a drain terminal (D16). P-FET 250 includes a gate terminal (G17), a source terminal (S17), and a drain terminal (D17). Source terminal S16 is electrically coupled to voltage source (Vdd) 208, gate terminal G16 is electrically coupled to delay negative active global clock signal (dly_nclk) 246, and drain terminal D16 is electrically coupled to gate signal 226. Source terminal S17 is electrically coupled to voltage source (Vdd) 208, gate terminal G17 is electrically coupled to complement of testhold signal (thold_b) 252, and drain terminal D17 is electrically coupled to gate signal 226. Complement of testhold signal (thold_b) 252 is a global hold control signal within the highest priority that has the capability to override all other signals within base block 200.

P-FET 254 includes a gate terminal (G18), a source terminal (S18), and a drain terminal (D18). P-FET 256 includes a gate terminal (G19), a source terminal (S19), and a drain terminal (D19). Source terminal S18 is electrically coupled to voltage source (Vdd) 208, gate terminal G18 is electrically coupled to force signal (force_t) 258, and drain terminal D18 is electrically coupled to source terminal S19. Force signal (force_t) 258 is an override control signal for scan purposes or initialization of non-scan latches. Gate terminal G19 is electrically coupled to activate signal (act) 268, and drain terminal D19 is electrically coupled to gate signal 226. Activate (act) signal 268, which is used in a functional modes, controls the local clock. That is, the local clock is not active unless the act signal 268 is active.

N-FET 260 includes a gate terminal (G20), a source terminal (S20), and a drain terminal (D20). N-FET 262 includes a gate terminal (G21), a source terminal (S21), and a drain terminal (D21). N-FET 264 includes a gate terminal (G22), a source terminal (S22), and a drain terminal (D22). N-FET 266 includes a gate terminal (G23), a source terminal (S23), and a drain terminal (D23). Source terminal S20 is electrically coupled to gate signal 226, gate terminal G20 is electrically coupled to delay negative active global clock signal (dly_nclk) 246, and drain terminal D20 is electrically coupled to both source terminal S21 and source terminal S22. Gate terminal G21 is electrically coupled to activate signal (act) 268, and gate terminal G22 is electrically coupled to force signal (force_t) 258. Drain terminal D21 is electrically coupled to drain terminal D22 and source terminal S23. Gate terminal G23 is electrically coupled to complement of testhold signal (thold_b) 252, and drain D23 is electrically coupled to ground 218.

Within base block 200, activate signal (act) 268, force signal (force_t) 258, complement of testhold signal (thold_b) 252, and delay negative active global clock signal (dly_nclk) 246 control the local clock buffer operations. That is, negative active global clock signal (nclk) 230 may be gated by gate signal 226, which is controlled by one or more of activate signal (act) 268, force signal (force_) 258, complement of testhold signal (thold_b) 252, or delay negative active global clock signal (dly_nclk) 246.

Figure 3:
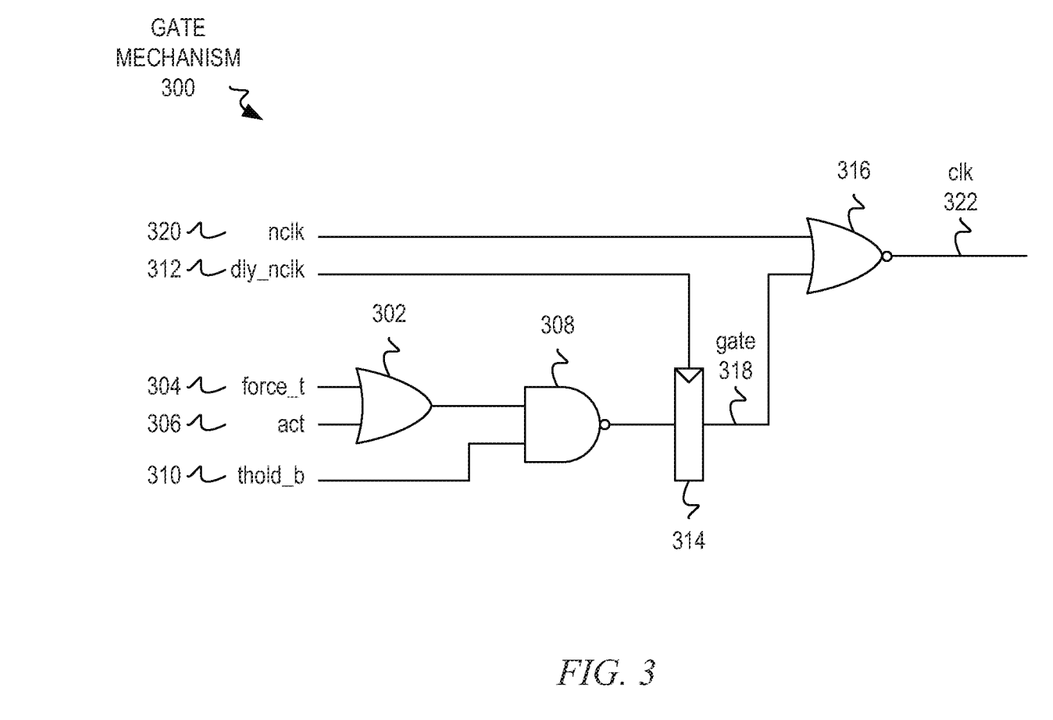
FIG. 3 depicts an exemplary logic block diagram of a gate mechanism in accordance with an illustrative embodiment.

FIG. 3 describes logic behavior of the N-FET and P-FET pairs depicted in FIG. 2 as an exemplary logic block diagram of a gate mechanism in accordance with an illustrative embodiment. Gate mechanism 300 is formed by devices coupled to activate signal (act), force signal (force_t), complement of testhold signal (thold_b), and delay negative active global clock signal (dly_nclk). Gate mechanism 300 comprises OR gate 302 which activates based on whether force signal (force_t) 304 or activate signal (act) 306 are active. NAND gate 308 is active unless the output of OR gate 302 and complement of testhold signal (thold_b) 310 are both active. When delay negative active global clock signal (dly_nclk) 312 is high, latch 314 updates to hold the value that is being output by NAND gate 308. NOR gate 316 is active only when both gate signal 318, which is the output of latch 314, is not active and when the negative active global clock signal (nclk) is not active. Thus, the clock signal (clk) 322, which is positive active as opposed to the negative active global clock signal (nclk) 320, is controlled based on the states of force signal (force_) 304, activate signal (act) 306, complement of testhold signal (thold_b) 310, and/or delay negative active global clock signal (dly_nclk) 312.

In normal operation mode, as is illustrated in FIG. 2, the falling edge of the clock signal (clk) is controlled by the rising edge of the internal feedback node (fb_2), since the internal feedback node (fb_2) is coupled to devices (i.e., transistors) that are further coupled to the output clock signal(clk). However, based on short cycle times and high mid-cycle uncertainties, a situation may occur where the rising edge of negative active global clock signal (nclk) is faster relative to the rising edge of feedback path signal (fb_2). That is, with faster switching time, the pulse width of the output clock signal (clk) is no longer determined by the feedback path signal (fb_2) but by the negative active global dock signal (nclk). This makes the LCB output pulse width vary over nclk frequency which is very critical for array applications. Thus, the illustrative embodiments provide a mechanism by which a cycle-time independent pulse width over different cycle times is provided. That is, the illustrative embodiments provide a mechanism that ensures that the feedback path is always faster than the fastest nclk situation by implementing a clock stretcher at the input stage to shift the rising nclk edge beyond the rising feedback edge.

Figure 4:
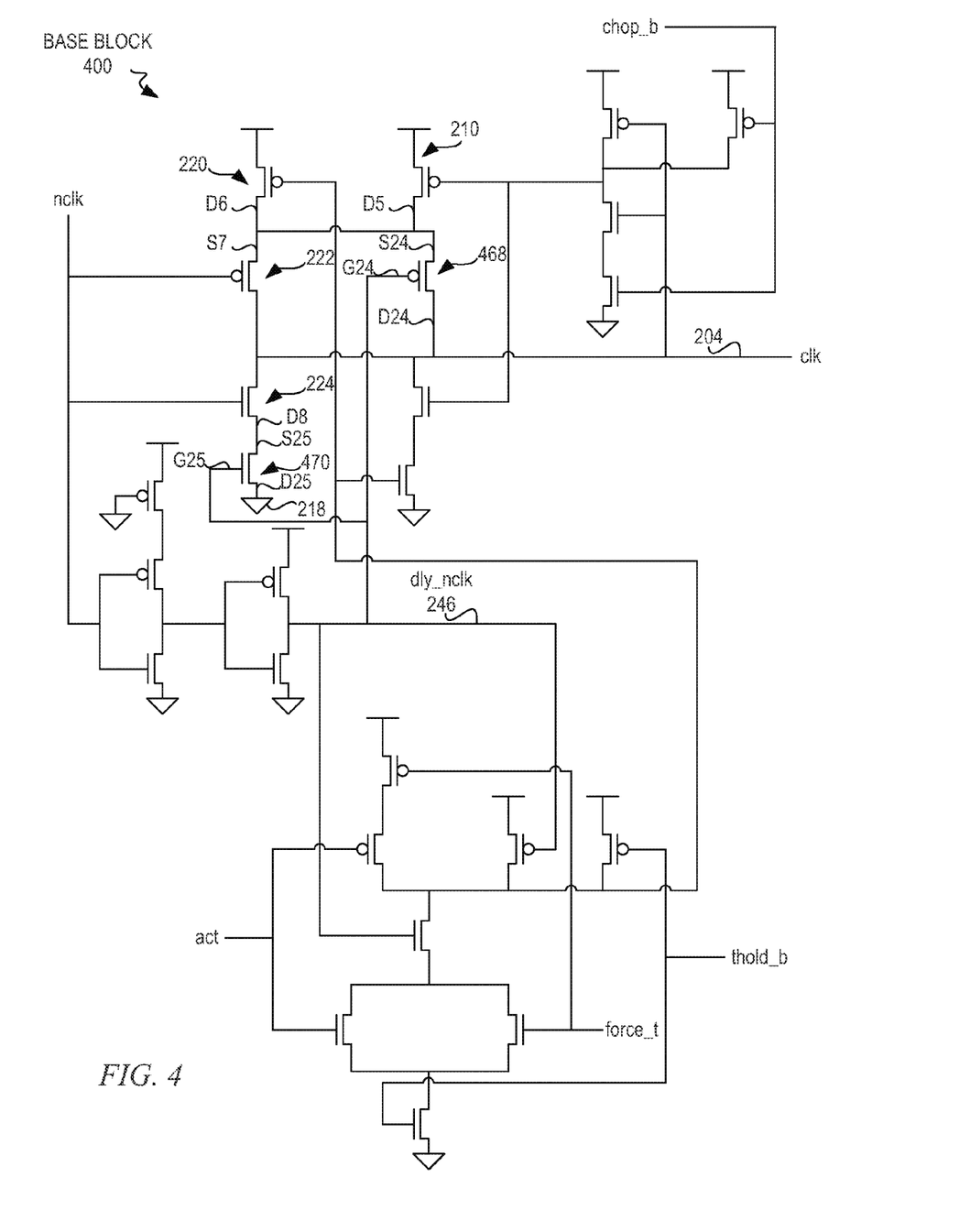
FIG. 4 depicts another exemplary configuration of a base block with a clock stretcher mechanism in accordance with an illustrative embodiment.

FIG. 4 depicts another exemplary configuration of a base block with dock stretcher mechanism in accordance with an illustrative embodiment. Base block 400 is similar to base block 200 of FIG. 2 in that, base block 400 comprises many P-Channel Field Effect Transistors (P-FETs) and N-Channel Field Effect Transistors (N-FETs) electrically coupled in a similar manner to that of base block 200. Thus, dements in FIG. 4 that are not specifically described as being electrically coupled and operating differently from elements in FIG. 2 are intended to be electrically coupled and operate in a similar manner as their corresponding elements in FIG. 2.

In addition to the various transistors described with respect to base block 200 in FIG. 2, base Hock 400 comprises P-FET 468 and N-FET 470. P-FET 468 includes agate terminal (G24), a source terminal (S24), and a drain terminal (D24). N-FET 470 includes a gate terminal (G25), a source terminal (S25), and a drain terminal (D25). In addition to drain terminal D6 of P-FET 220 being electrically coupled to source terminal S7 of P-FET 222 and drain terminal D5 of P-FET 210, in base block 400, drain terminal D6 is further electrically coupled to source terminal S24. Drain terminal D24 is electrically coupled to output clock signal (clk) 204 and gate terminal G24 is electrically coupled to delay negative active global clock signal (dly_nclk) 246. Additionally, rather than drain terminal D8 of N-FET 224 being electrically coupled to ground 218, drain terminal D8 is electrically coupled to source terminal S25. Drain terminal D25 is then electrically coupled to ground 218 and gate terminal G25 is electrically coupled to delay negative active global clock signal (dly_nclk) 246.

Figure 5:
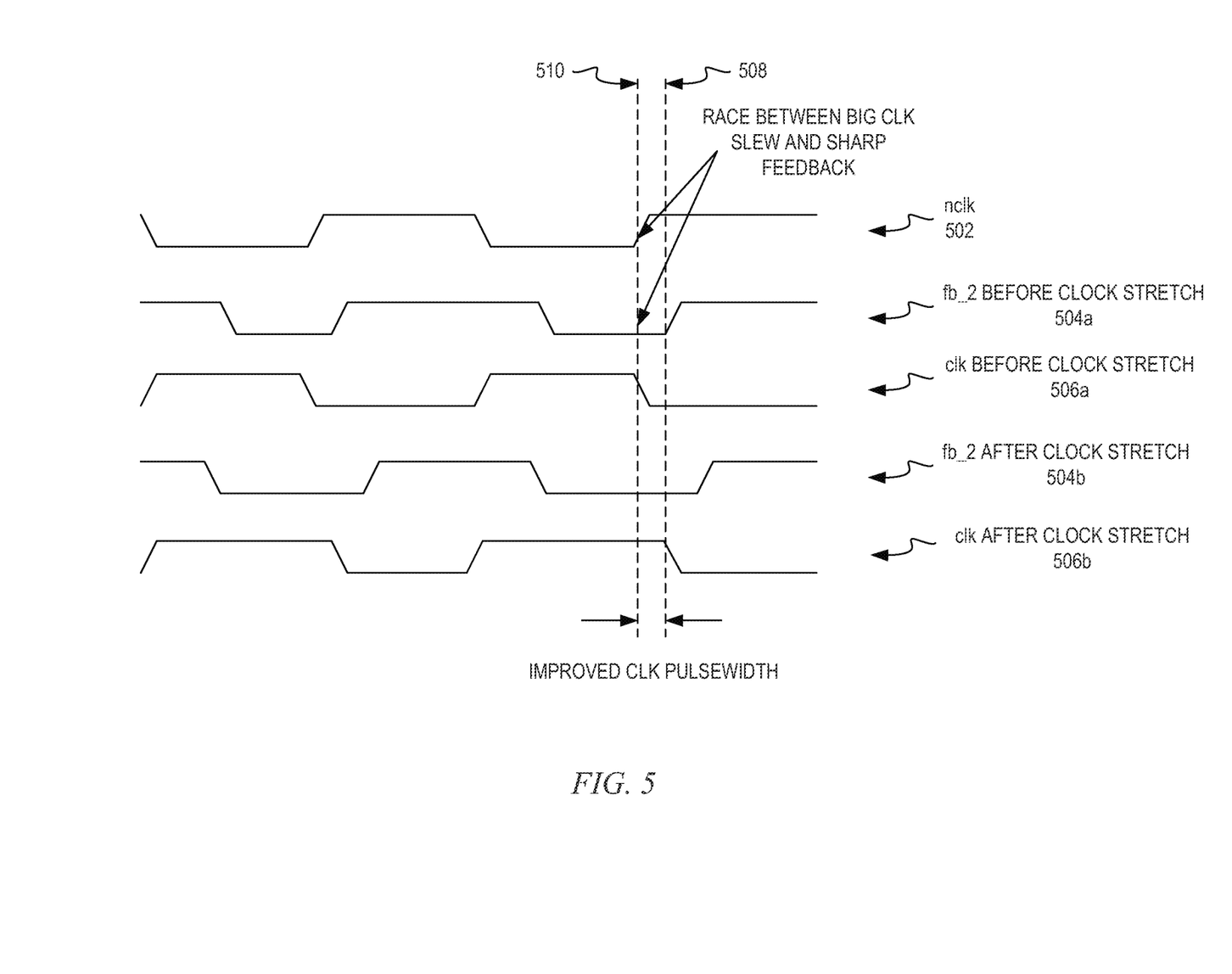
FIG. 5 depicts exemplary waveforms that depict the improvement made by the implementation of the clock stretcher mechanism within a base block in accordance with an illustrative embodiment.

FIG. 5 depicts exemplary waveforms that depict the improvement made by the implementation of the clock stretcher mechanism within a base block in accordance with an illustrative embodiment. Waveform 502 depicts arising and falling negative active global clock signal (nclk) signal. Waveform 504a depicts the state of feedback path signal (fb_2) and waveform 506a depicts the state of clock (clk) output signal before implementation of the clock stretch mechanism. As is illustrated by line 508, there is a race between big clock slew and the sharp feedback of feedback path signal (fb_2). Waveform 504b depicts the state of feedback path signal (fb_2) and waveform 506b depicts the state of output clock signal (clk) after implementation of the clock stretch mechanism. With the implementation of clock stretch mechanism of FIG. 4, the difference between line 508 and line 510 illustrates an improved feedback path for feedback node (fb_2) such that the feedback path signal (fb_2) is received before the rising edge of the negative active global clock signal (nclk) so that the feedback path signal (fb_2) controls the falling edge of the clock (clk) output signal.

Thus, the illustrative embodiments provide an advanced array local clock buffer (LCB) base block circuit that overcomes the race between a feedback path signal and a rising negative active global clock signal (nclk). The illustrative embodiments provide a clock stretcher at the array LCB base block input state that shifts the rising nclk edge beyond the rising feedback path signal edge under all conditions. The clock stretcher mechanism overcomes current base block limitations with only two additional devices, provides much sought after area reduction by using smaller devices in the feedback path, and eliminates cycle stealing within the local clock buffer. Further, all current delay and pulse width settings remain effective for higher speed frequencies with dependency on local clock buffer output pulse widths.

Figure 6:
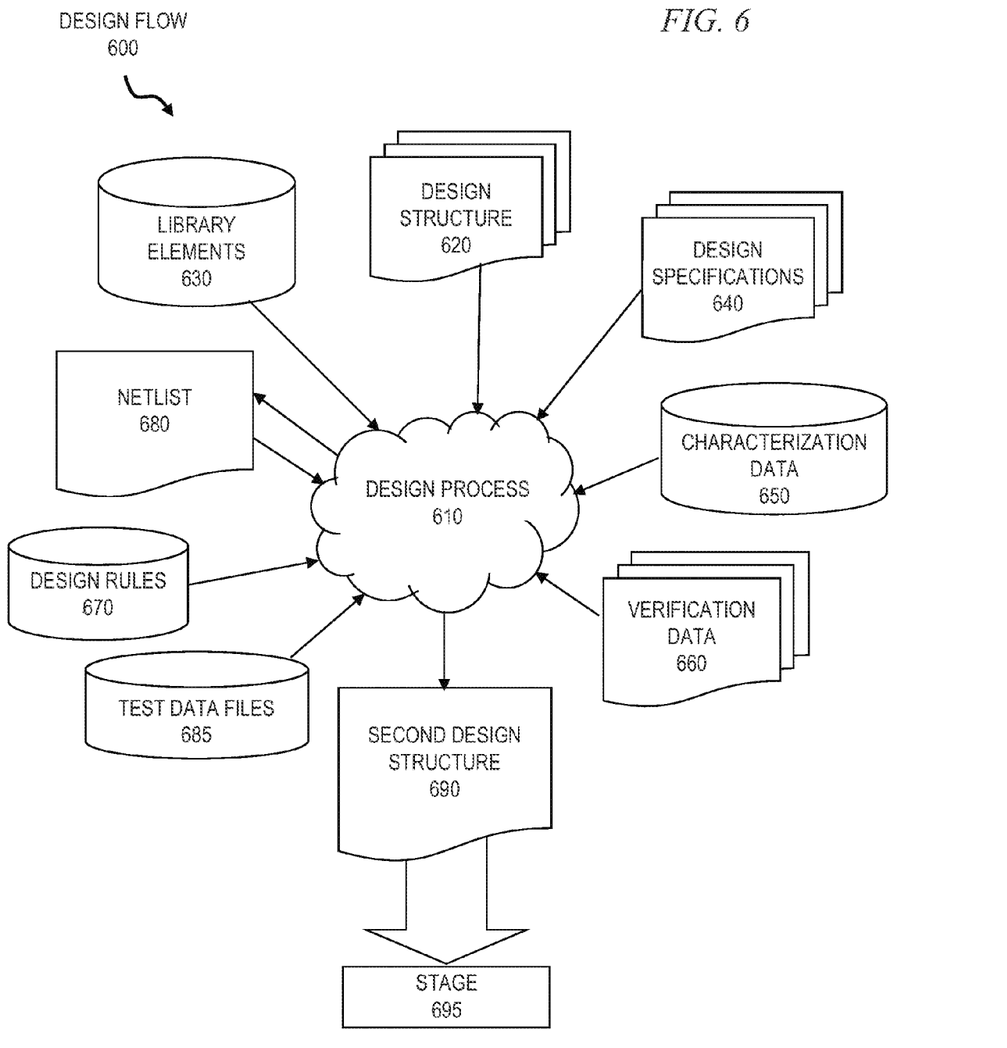
FIG. 6 shows a block diagram of an exemplary design flow used, for example, in semiconductor IC logic design, simulation, test, layout, and manufacture.

FIG. 6 shows a block diagram of an exemplary design flow 600 used, for example, in semiconductor IC logic design, simulation, test, layout, and manufacture. Design flow 600 includes processes and mechanisms for processing design structures to generate logically or otherwise functionally equivalent representations of the embodiments of the invention shown in FIGS. 2-5. The design structures processed and/or generated by design flow 600 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission or storage medium, design structure 620 may be accessed and processed by one or more hardware and/or software modules within design process 610 to simulate or otherwise functionally represent an electronic component, circuit, electronic or logic module, apparatus, device, or system such as those shown in FIGS. 2-5. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 2-5 to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include modules for performing standard circuit design processes such as timing analysis, verification, design rule checking, place and route operations, etc.

Design process 610 employs and incorporates well-known logic and physical design tools such as HDL compilers and simulation model build tools to process design structure 620 together with some or all of the depicted supporting data structures to generate a second design structure 690. Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-5. In one embodiment, design structure 690 may comprise a compiled, executable HDL simulation model that functionally simulates the devices shown in FIGS. 2-5.

Design structure 690 may also employ a data format used for the exchange of layout data of integrated circuits and/or symbolic data format (e.g. information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 2-5. Design structure 690 may then proceed to a stage 695 where, for example, design structure 690 proceeds to tape-out, is released to manufacturing, is released to a mask house, is sent to another design house, is sent back to the customer, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A design structure embodied in a non-transitory machine readable medium for designing, manufacturing, or testing an integrated circuit, the design structure comprising:
   a first design structure element for modifying a clock chopper signal in order to form a feedback path signal; and
   a second design structure element for shifting the rising edge of a negative active global clock signal so that the rising edge of the negative active global clock signal rises after the rising edge of the feedback path signal using a delay negative active global clock signal.

2. The design structure of claim 1, wherein shifting the rising edge of the negative active global clock signal so that the rising edge of the negative active global clock signal rises after the rising edge of the feedback path signal ensures that the feedback path signal is received before the rising edge of the negative active global clock signal so that the feedback path signal controls the falling edge of an output clock signal.

3. The design structure of claim 1, wherein the first design structure element comprises:
   a first P-FET including a gate terminal (G1), a source terminal (S1), and a drain terminal (D1), wherein the gate terminal G1 is electrically coupled to clock chopper signal and wherein the source terminal S1 is electrically coupled to a voltage source;
   a second P-FET including a gate terminal (G2), a source terminal (S2), and a drain terminal (D2), wherein the source terminal S2 is electrically coupled to the voltage source, wherein the gate terminal G2 is electrically coupled to an output clock signal, and wherein the drain terminal D2 is electrically coupled the drain terminal D1, thereby forming a feedback node that produces the feedback path signal;
   a first N-FET including a gate terminal (G3), a source terminal (S3), and a drain terminal (D3), wherein the gate terminal G3 is electrically coupled to the gate terminal G2 and the output clock signal and wherein the source terminal is electrically coupled to the drain terminal D2 and the drain terminal D1; and
   a second N-FET including a gate terminal (G4), a source terminal (S4), and a drain terminal (D4), wherein the source terminal S4 is electrically coupled to the drain terminal D3, wherein the gate terminal G4 is electrically coupled to clock chopper signal, and wherein the drain terminal D4 is electrically coupled to ground.

4. The design structure of claim 1, wherein the second design structure element comprises:
   a first P-FET including a gate terminal (G5), a source terminal (S5), and a drain terminal (D5), wherein the source terminal S5 is electrically coupled to a voltage source and wherein the gate terminal G5 is electrically coupled to a feedback node that produces the feedback path signal;
   a second P-FET including a gate terminal (G6), a source terminal (S6), and a drain terminal (D6), wherein the source terminal S6 is electrically coupled to the voltage source and wherein the gate terminal G6 is electrically coupled to a gate signal;
   a third P-FET including a gate terminal (G7), a source terminal (S7), and a drain terminal (D7), wherein the source terminal S7 is electrically coupled to the drain terminal D5 and the drain terminal D6, wherein the gate terminal G7 is electrically coupled to the negative active global clock signal, and wherein the drain terminal D7 is electrically coupled to an output clock signal;
   a fourth P-FET including a gate terminal (G24), a source terminal (S24), and a drain terminal (D24), wherein the source terminal S24 is electrically coupled to the drain terminal D5, the drain terminal D6, and the source terminal S7, wherein the gate terminal G24 is electrically coupled to the delay negative active global clock signal, and wherein the drain terminal D7 is electrically coupled to the output clock signal;
   a first N-FET including a gate terminal (G8), a source terminal (S8), and a drain terminal (D8), wherein the source terminal S8 is electrically coupled to the drain terminal D7 and the output clock signal and wherein the gate terminal G8 is electrically coupled to the negative active global clock signal;
   a second N-FET including a gate terminal (G25), a source terminal (S25), and a drain terminal (D25), wherein the source terminal S25 is electrically coupled to the drain terminal D8, wherein the gate terminal G25 is electrically coupled to the negative active global clock signal, and wherein the drain terminal D25 is electrically coupled to ground;
   a third N-FET including a gate terminal (G9), a source terminal (S9), and a drain terminal (D9), wherein the source terminal S9 is electrically coupled to the output clock signal and wherein the gate terminal G9 is electrically coupled to the feedback node that produces the feedback path signal; and
   a fourth N-FET including a gate terminal (G10), a source terminal (S10), and a drain terminal (D10), wherein the source terminal S10 is electrically coupled to the drain terminal D9, wherein the gate terminal G10 is electrically coupled to the gate signal, and wherein the drain terminal D10 is electrically coupled to ground.

5. The design structure of claim 1, wherein the delay negative active global clock signal is generated by a third design structure element that comprises:
   a first P-FET including a gate terminal (G11), a source terminal (S11), and a drain terminal (D11), wherein the source terminal S11 is electrically coupled to a voltage source and wherein the gate terminal G11 is electrically coupled to ground;
   a second P-FET including a gate terminal (G12), a source terminal (S12), and a drain terminal (D12), wherein the source terminal S12 is electrically coupled to drain terminal D11 and wherein the gate terminal G12 is electrically coupled to the negative active global clock signal;
   a first N-FET includes a gate terminal (G13), a source terminal (S13), and a drain terminal (D13), wherein the source terminal S13 is electrically coupled to drain terminal D12, wherein the gate terminal G13 is electrically coupled the gate terminal G12 and the negative active global clock signal, and wherein the drain terminal D13 is electrically coupled to ground;
   a third P-FET including a gate terminal (G14), a source terminal (S14), and a drain terminal (D14), wherein the source terminal S14 is electrically coupled to the voltage source and wherein the gate terminal G14 is electrically coupled to the drain terminal D12 and source terminal S13; and
   a second N-FET including a gate terminal (G15), a source terminal (S15), and a drain terminal (D15), wherein the source terminal S15 is electrically coupled the drain terminal D14, thereby forming the delay negative active global clock signal, wherein the gate terminal G15 is electrically coupled to the gate terminal G14, the drain terminal D12 and source terminal S13, and wherein the drain terminal D15 is electrically coupled to ground.

6. The design structure of claim 1, wherein the negative active global clock signal may be gated by a gate signal.

7. The design structure of claim 6, wherein the gate signal is controlled by one or more of an activate signal, a force signal, a complement of a testhold signal, or the delay negative active global clock signal.

* * * * *